United States Patent
Tian et al.

(10) Patent No.: US 12,020,026 B2
(45) Date of Patent: Jun. 25, 2024

(54) INSTRUCTION WRITING METHOD AND APPARATUS, AND NETWORK DEVICE

(71) Applicant: Huawei Technologies Co., Ltd., Shenzhen (CN)

(72) Inventors: Taixu Tian, Dongguan (CN); Zhongzhen Wang, Beijing (CN); Jincong Huang, Dongguan (CN); Wenliang Shen, Nanjing (CN); Weijian Luo, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 49 days.

(21) Appl. No.: 17/840,326

(22) Filed: Jun. 14, 2022

(65) Prior Publication Data

US 2022/0308868 A1  Sep. 29, 2022

Related U.S. Application Data

(63) Continuation of application No. PCT/CN2020/116972, filed on Sep. 23, 2020.

(30) Foreign Application Priority Data

Dec. 16, 2019 (CN) .......................... 201911296382.6
Mar. 31, 2020 (CN) .......................... 202010246826.1

(51) Int. Cl.
  *G06F 9/24* (2006.01)
  *G06F 9/26* (2006.01)
  *G06F 9/30* (2018.01)

(52) U.S. Cl.
  CPC ............... *G06F 9/24* (2013.01); *G06F 9/267* (2013.01); *G06F 9/30145* (2013.01)

(58) Field of Classification Search
  CPC ......... G06F 9/24; G06F 9/267; G06F 9/30145
  See application file for complete search history.

(56) References Cited

U.S. PATENT DOCUMENTS

| 8,010,990 B2 | 8/2011 | Ferguson et al. |
| 10,761,849 B2 | 9/2020 | Chou et al. |
| (Continued) | | |

FOREIGN PATENT DOCUMENTS

| CN | 100365575 C | 1/2008 |
| CN | 101321132 A | 12/2008 |
| (Continued) | | |

OTHER PUBLICATIONS

"Series Y: Global Information Infrastructure, Internet Protocol Aspects and Next-Generation Networks, Internet Protocol aspects—Operation, administration and maintenance OAM functions and mechanisms for Ethernet based networks," ITU-T, Telecommunication Standardization Sector of ITU, Y.1731, May 2006, 80 pages.

*Primary Examiner* — Zachary K Huson
(74) *Attorney, Agent, or Firm* — Slater Matsil, LLP

(57) ABSTRACT

An instruction writing method, apparatus, and network device are provided to reduce a requirement for a storage space of a microcode processor. The method includes obtaining, by a first device, first indication information, where the first indication information indicates the first device to enable a first service function, and writing, by the first device, a first microcode instruction set corresponding to the first service function into an unused storage space of a target microcode processor in a network processor, where a size of the unused storage space is greater than or equal to a size of the first microcode instruction set.

18 Claims, 4 Drawing Sheets

(56) References Cited

U.S. PATENT DOCUMENTS

| | | | |
|---|---|---|---|
| 10,877,770 | B2 | 12/2020 | Liu et al. |
| 2003/0046358 | A1 | 3/2003 | Johnson et al. |
| 2004/0221128 | A1* | 11/2004 | Beecroft ............. G06F 12/1072 |
| | | | 711/E12.066 |
| 2006/0069850 | A1* | 3/2006 | Rudelic ............... G06F 12/0246 |
| | | | 711/E12.008 |
| 2007/0088939 | A1* | 4/2007 | Baumberger ............. G06F 9/24 |
| | | | 712/248 |
| 2011/0161575 | A1 | 6/2011 | Collins |
| 2013/0145128 | A1 | 6/2013 | Schardt et al. |
| 2015/0078176 | A1 | 3/2015 | Haggar et al. |

FOREIGN PATENT DOCUMENTS

| | | |
|---|---|---|
| CN | 103986660 A | 8/2014 |
| CN | 108845834 A | 11/2018 |
| CN | 101335644 A | 12/2018 |
| CN | 109791486 A | 5/2019 |

\* cited by examiner

INSTRUCTION WRITING METHOD AND APPARATUS, AND NETWORK DEVICE

CROSS-REFERENCE TO RELATED APPLICATIONS

This application is a continuation of International Application No PCT/CN2020/116972, filed on Sep. 23, 2020, which claims priority to Chinese Patent Application No. 201911296382.6, filed on Dec. 16, 2019, and Chinese Patent Application No. 202010246826.1, filed on Mar. 31, 2020. All of the aforementioned patent applications are hereby incorporated by reference in their entireties.

TECHNICAL FIELD

This application relates to the communications field, and in particular, to an instruction writing method and apparatus, and a network device.

BACKGROUND

A network processor (NP) is a programmable device, and can be configured to perform data packet processing, protocol analysis, route searching, and the like in the communications field. The network processor includes one or more microcode processors. The microcode processor is a processing unit configured to execute a service function in the network processor, and each microcode processor has a corresponding storage space.

In the conventional technology, each time the network processor is started, an instruction writing device needs to load all microcode instruction sets into a microcode processor, so that the microcode processor executes the microcode instruction sets as required. However, this manner imposes a relatively high requirement on a storage space of the microcode processor, and corresponding costs required for implementing more service functions are also relatively high.

SUMMARY

This application provides an instruction writing method and apparatus, and a network device, to reduce a requirement for a storage space of a microcode processor and cut costs.

According to a first aspect, this application provides an instruction writing method. The method is performed by an instruction writing device. The instruction writing device may be a central processing unit, a microprocessor, or the like. This is not specifically limited in this application. The method includes the following steps: The instruction writing device obtains first indication information. The first indication information is used to indicate the instruction writing device to enable a first service function. A service function is a function implemented by a network processor, for example, a receiving function, a sending function, or an internet protocol (IP) packet processing function. The instruction writing device enables the first service function based on the first indication information. Specifically, the instruction writing device writes a first microcode instruction set corresponding to the first service function into an unused storage space of a target microcode processor in the network processor. A size of the unused storage space is greater than or equal to a size of the first microcode instruction set. The first microcode instruction set includes at least one microcode instruction, and the microcode instruction is an instruction that can implement the first service function. In this embodiment of this application, the instruction writing device writes the corresponding first microcode instruction set into the unused storage space of the target microcode processor according to a requirement for the first service function, instead of writing all microcode instruction sets into a storage space of the microcode processor. Therefore, a requirement for the storage space of the target microcode processor is relatively low. In addition, a plurality of microcode instruction sets that are used to implement corresponding service functions are allowed to be loaded into one microcode processor at different moments as required. This can also achieve an objective of flexibly using a remaining storage space of the target microcode processor, and improve utilization efficiency of a storage space of the network processor. The unused storage space is an available storage space.

The network processor includes one or more microcode processors. Therefore, optionally, before the instruction writing device writes the first microcode instruction set corresponding to the first service function into the unused storage space of the target microcode processor in the network processor, the instruction writing method further includes: The instruction writing device determines the target microcode processor based on one or more unused storage spaces respectively included in the one or more microcode processors and the size of the first microcode instruction set. The one or more microcode processors belong to the network processor, the one or more microcode processors include the target microcode processor, and the size of the unused storage space of the target microcode processor is greater than or equal to the size of the first microcode instruction set. In other words, the instruction writing device may determine the target microcode processor whose size of the unused storage space is greater than or equal to the size of the first microcode instruction set in the one or more microcode processors included in the network processor. This achieves an objective of flexibly selecting the target microcode processor to enable the first service function.

Optionally, when the first service function is not required, the method further includes the following step: The instruction writing device obtains second indication information. The second indication information is used to indicate the instruction writing device to disable the first service function. That the instruction writing device disables the first service function is specifically: The instruction writing device unloads the first microcode instruction set from the target microcode processor based on the second indication information, to save the storage space of the target microcode processor.

Optionally, the network processor includes a plurality of microcode processors, and that the instruction writing device writes a first microcode instruction set corresponding to the first service function into a target microcode processor in the network processor includes: writing the first microcode instruction set into each of the plurality of microcode processors. The plurality of microcode processors include the target microcode processor. In other words, the first microcode instruction set is written into each of the plurality of microcode processors, so that each microcode processor can have the first service function, and a service execution capability of the network processor is improved.

Optionally, the first microcode instruction set includes a plurality of first microcode instruction subsets, and each of the plurality of first microcode instruction subsets is used to implement one first service sub-function.

Optionally, the method further includes: The instruction writing device obtains third indication information. The third indication information is used to indicate the instruction writing device to enable a second service function. The instruction writing device determines a second microcode instruction set corresponding to the second service function. The second microcode instruction set includes a plurality of second microcode instruction subsets. The instruction writing device compares the plurality of first microcode instruction subsets with the plurality of second microcode instruction subsets, and unloads one or more third microcode instruction subsets. The one or more third microcode instruction subsets belong to the plurality of first microcode instruction subsets, but do not belong to the plurality of second microcode instruction subsets. In a possible case, when obtaining the third indication information, the instruction writing device further obtains indication information used to disable the first service function. In another case, for example, when indication information entered by a user is used to indicate a service function that only needs to be enabled currently, the third indication information obtained by the instruction writing device is used to indicate the instruction writing device to simultaneously enable the second service function and disable the first service function. Because the one or more third microcode instruction subsets belong to the plurality of first microcode instruction subsets, but do not belong to the plurality of second microcode instruction subsets, the instruction writing device unloads only the one or more third microcode instruction subsets instead of an intersection between the plurality of first microcode instruction subsets and the plurality of second microcode instruction subsets. This can help improve efficiency of writing the second microcode instruction set corresponding to the second service function by the instruction writing device.

Optionally, the first microcode instruction set includes a jump instruction, and that the instruction writing device writes a first microcode instruction set corresponding to the first service function into an unused storage space of a target microcode processor in the network processor includes: The instruction writing device obtains a first start address of the first microcode instruction set that is allowed to be written into the storage space of the target microcode processor. The instruction writing device determines a jump address of the jump instruction in the storage space based on a relative offset address of a jump address of the jump instruction in the first microcode instruction set and the first start address. The jump instruction is an instruction used to perform a jump operation. The instruction writing device writes the jump instruction into the target microcode processor based on the jump address of the jump instruction in the storage space. The jump address of the jump instruction is modified, so that the jump instruction can be ensured to jump to a microcode instruction at a correct location when the jump instruction is executed.

Optionally, to effectively use the storage space of the target microcode processor, the method further includes: The instruction writing device organizes a plurality of fragment storage spaces of the target microcode processor to obtain the unused storage space. The size of the unused storage space is equal to a sum of sizes of the plurality of fragment storage spaces. The fragment storage space is an idle storage space. In a possible case, when finding that a quantity of storage spaces whose space sizes each are less than a threshold reaches a specific quantity, the instruction writing device organizes a plurality of fragment storage spaces. In another possible case, when finding that the size of the to-be-written first microcode instruction set is greater than a size of any idle storage space of a microcode processor, the instruction writing device organizes a plurality of fragment storage spaces. After the organization, the instruction writing device may obtain an unused storage space into which the first microcode instruction set can be written, to write the first microcode instruction set.

Specifically, in a possible implementation, before the instruction writing device writes the first microcode instruction set into the unused storage space, the storage space of the target microcode processor stores a fourth microcode instruction set and a fifth microcode instruction set, and that the instruction writing device organizes a plurality of fragment storage spaces of the target microcode processor includes: When a storage space between the fourth microcode instruction set and the fifth microcode instruction set is not occupied, the instruction writing device obtains an end address of the fourth microcode instruction set in the target microcode processor and a second start address of the fifth microcode instruction set in the target microcode processor. The end address is less than the second start address. The instruction writing device modifies the start address of storing the fifth microcode instruction set to an updated second start address. The updated second start address is between the end address and the to-be-updated second start address. A specific implementation of modifying the start address of the fifth microcode instruction set to the updated second start address is unloading the fifth microcode instruction set, and writing the fifth microcode instruction set based on the updated second start address.

In another possible implementation, before the instruction writing device writes the first microcode instruction set into the unused storage space, the target microcode processor includes a fourth microcode instruction set and a fifth microcode instruction set. That the instruction writing device organizes a plurality of fragment storage spaces of the target microcode processor includes: When a storage space between the fourth microcode instruction set and the fifth microcode instruction set is not occupied, the instruction writing device obtains a third start address of the fourth microcode instruction set, a length of a storage space occupied by the fourth microcode instruction set, and a second start address of the fifth microcode instruction set in the target microcode processor. The third start address of the fourth microcode instruction set is less than the second start address. The instruction writing device determines an updated third start address of the fourth microcode instruction set based on the start address of the fifth microcode instruction set and the length of the storage space occupied by the fourth microcode instruction set. The updated third start address is between the to-be-updated third start address and the second start address. The instruction writing device modifies the start address of storing the fourth microcode instruction set to the updated third start address. A specific implementation of modifying the start address of the fourth microcode instruction set to the updated third start address is: The instruction writing device unloads the fourth microcode instruction set, and writes the fourth microcode instruction set based on the updated third start address.

The foregoing two possible implementations are merely used as possible examples. A person skilled in the art may alternatively design another fragment space organization manner based on an actual situation.

Optionally, before the instruction writing device writes the first microcode instruction set corresponding to the first service function into the unused storage space of the target microcode processor in the network processor, the method further includes: When the network processor is powered on, the instruction writing device writes a necessary instruction set into the unused storage space of the target microcode processor in the network processor. The necessary instruction set is an instruction set for implementing a necessary service function. In this way, after the network processor is powered on, a necessary instruction in the necessary instruction set can be first executed, to implement a necessary service function of the network processor.

According to a second aspect, this application provides an instruction writing apparatus. The apparatus is applied to an instruction writing device. The apparatus includes: a first obtaining unit, configured to obtain first indication information, where the first indication information is used to indicate the instruction writing device to enable a first service function; and a first writing unit, configured to write a first microcode instruction set corresponding to the first service function into an unused storage space of a target microcode processor in a network processor, where a size of the unused storage space is greater than or equal to a size of the first microcode instruction set. In this application, the instruction writing device writes the corresponding first microcode instruction set into the unused storage space of the target microcode processor according to a requirement for the first service function, instead of writing all microcode instruction sets into a storage space of the microcode processor. Therefore, a requirement for the storage space of the target microcode processor is relatively low, and costs are also relatively low. In addition, microcode instruction sets that are used to implement a plurality of service functions are allowed to be loaded into one microcode processor. This can also achieve an objective of flexibly using a remaining storage space of the target microcode processor, and improve utilization efficiency of a storage space of the network processor.

Optionally, the network processor includes one or more microcode processors, and the apparatus further includes: a first determining unit, configured to determine the target microcode processor based on one or more unused storage spaces respectively included in the one or more microcode processors and the size of the first microcode instruction set, where the one or more microcode processors belong to the network processor, the one or more microcode processors include the target microcode processor, and the size of the unused storage space of the target microcode processor is greater than or equal to the size of the first microcode instruction set.

Optionally, the apparatus further includes: a second obtaining unit, configured to obtain second indication information, where the second indication information is used to indicate the instruction writing device to disable the first service function; and a first unloading unit, configured to unload the first microcode instruction set from the target microcode processor based on the second indication information.

Optionally, the network processor includes a plurality of microcode processors.

The first writing unit is configured to write the first microcode instruction set into each of the plurality of microcode processors, where the plurality of microcode processors include the target microcode processor.

Optionally, the first microcode instruction set includes a plurality of first microcode instruction subsets, and each of the plurality of first microcode instruction subsets is used to implement one first service sub-function.

Optionally, the apparatus further includes: a third obtaining unit, configured to obtain third indication information, where the third indication information is used to indicate the instruction writing device to enable a second service function; a second determining unit, configured to determine a second microcode instruction set corresponding to the second service function, where the second microcode instruction set includes a plurality of second microcode instruction subsets; and a second unloading unit, configured to: compare the plurality of first microcode instruction subsets with the plurality of second microcode instruction subsets, and unload one or more third microcode instruction subsets, where the one or more third microcode instruction subsets belong to the plurality of first microcode instruction subsets, but do not belong to the plurality of second microcode instruction subsets.

Optionally, the first microcode instruction set includes a jump instruction.

The first writing unit is configured to: obtain a first start address of the first microcode instruction set that is allowed to be written into the storage space of the target microcode processor; determine a jump address of the jump instruction in the storage space based on a relative offset address of a jump address of the jump instruction in the first microcode instruction set and the first start address, where the jump instruction is an instruction used to perform a jump operation; and write the jump instruction into the target microcode processor based on the jump address of the jump instruction in the storage space.

Optionally, the apparatus further includes: an organization unit, configured to organize a plurality of fragment storage spaces of the target microcode processor to obtain the unused storage space, where the size of the unused storage space is equal to a sum of sizes of the plurality of fragment storage spaces.

Optionally, before the instruction writing device writes the first microcode instruction set into the unused storage space, the storage space of the target microcode processor stores a fourth microcode instruction set and a fifth microcode instruction set. The organization unit is configured to: when a storage space between the fourth microcode instruction set and the fifth microcode instruction set is not occupied, obtain an end address of the fourth microcode instruction set in the target microcode processor and a second start address of the fifth microcode instruction set in the target microcode processor, where the end address is less than the second start address; and modify the start address of storing the fifth microcode instruction set to an updated second start address, where the updated second start address is between the end address and the to-be-updated second start address.

Optionally, before the instruction writing device writes the first microcode instruction set into the unused storage space, the target microcode processor includes a fourth microcode instruction set and a fifth microcode instruction set. The organization unit is configured to: when a storage space between the fourth microcode instruction set and the fifth microcode instruction set is not occupied, obtain a third start address of the fourth microcode instruction set, a length of a storage space occupied by the fourth microcode instruction set, and a second start address of the fifth microcode instruction set in the target microcode processor, where the third start address of the fourth microcode instruction set is less than the second start address; determine an updated third start address of the fourth microcode instruction set based on the start address of the fifth microcode instruction set and the length of the storage space occupied by the fourth microcode instruction set, where the updated third start address is between the to-be-updated third start address and the second start address; and modify the start address of storing the fourth microcode instruction set to the updated third start address.

Optionally, the apparatus further includes: a second writing unit, configured to: before the first writing unit writes the first microcode instruction set corresponding to the first service function into the unused storage space of the target microcode processor in the network processor, when the network processor is powered on, write a necessary instruction set into the unused storage space of the target microcode processor in the network processor.

According to a third aspect, this application provides a network device. The network device includes a processor and a memory. The memory is configured to store a computer program or instructions; and the processor is configured to invoke the computer program or the instructions stored in the memory, so that an instruction writing device performs the instruction writing method according to the first aspect.

According to a fourth aspect, this application provides a network device. The network device includes a processor. The processor is configured to invoke a computer program or instructions stored in a memory, so that an instruction writing device performs the instruction writing method according to the first aspect.

According to a fifth aspect, an embodiment of this application provides a network system. The network system includes an instruction writing device and a network processor. The instruction writing device may be the instruction writing device according to the second aspect, the third aspect, or the fourth aspect, and may be configured to perform the instruction writing method according to the first aspect; and the network processor is configured to perform either of or both a first microcode instruction set and a second microcode instruction set.

According to a sixth aspect, an embodiment of this application provides a computer-readable storage medium, including instructions. When the instructions are run on a computer, the computer is enabled to perform the instruction writing method according to the first aspect.

According to a seventh aspect, an embodiment of this application provides a chip system, including a processor and an interface circuit. The interface circuit is configured to: receive instructions and transmit the instructions to the processor; and the processor is configured to perform the instruction writing method according to the first aspect.

DETAILED DESCRIPTION OF ILLUSTRATIVE EMBODIMENTS

Embodiments of this application provide an instruction writing method. In the method, a microcode instruction set that includes one or more microcode instructions and that is used to implement a specific service function is written into a storage space of a microcode processor as required. This reduces a requirement for the storage space of the microcode processor, cuts costs, and broadens an application scenario scope.

For ease of understanding, an application scenario in embodiments of this application is first described.

Figure 1:
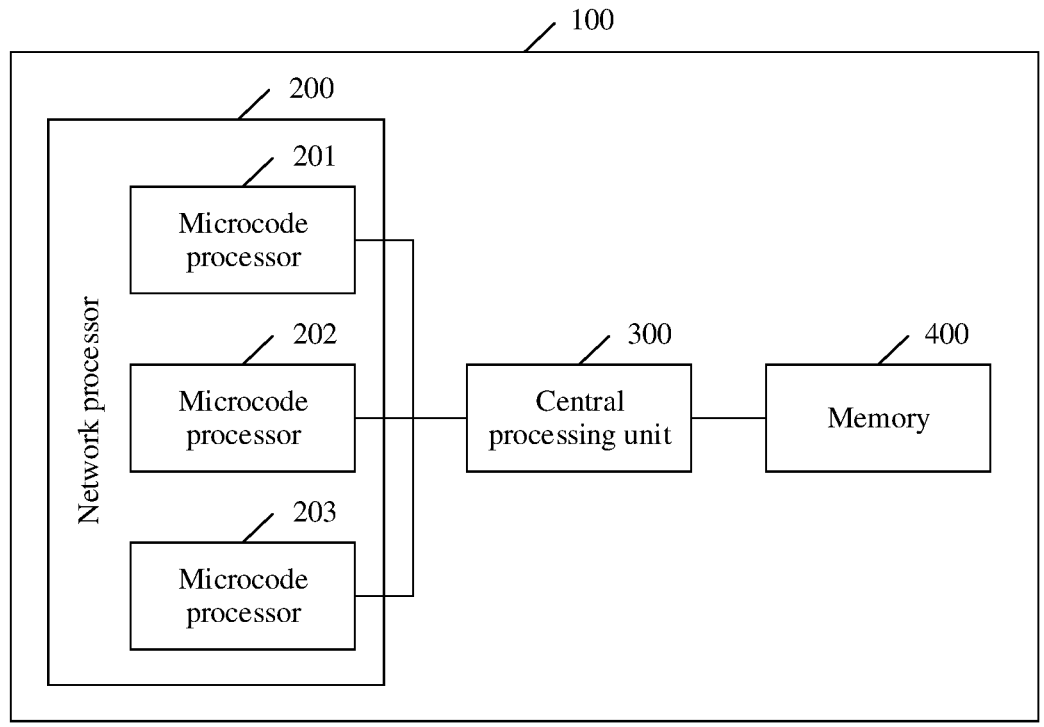
FIG. 1 is a schematic diagram of a structure of a device 100 according to an embodiment of this application.

FIG. 1 is a schematic diagram of a structure of a device 100 according to an embodiment of this application.

In FIG. 1, the device 100 includes a network processor 200, a central processing unit (CPU) 300, and a memory 400. The network processor 200 includes a microcode processor 201, a microcode processor 202, and a microcode processor 203. Each of the microcode processor 201, the microcode processor 202, and the microcode processor 203 establishes a communication connection to the central processing unit 300, and the central processing unit 300 connects to the memory 400. The central processing unit 300 is configured to write a microcode instruction set into the network processor. The microcode instruction set may be stored in the microcode processors 201 to 203, and can be executed to implement a specific service function. Before being written into the microcode processors 201 to 203, the microcode instruction set may be stored in the memory 400. In some embodiments, the memory 400 and the CPU 300 may alternatively be integrated together. In some embodiments, the network processor 200 may include one or more microcode processors. In some embodiments, the CPU 300 may include one or more kernels. In some embodiments, the device 100 includes one or more CPUs.

In this embodiment of this application, the device 100 may be, for example, a router, a switch, a firewall, or a network access device.

The central processing unit 300 may alternatively be replaced with an instruction processing apparatus of another type, and the instruction processing apparatus may be implemented in a manner of hardware, software, or a combination of software and hardware. The instruction processing apparatus may be, for example, a microcontroller unit or a chip of another type, or may be independent software or integrated software that has an instruction processing capability. The instruction processing apparatus may include a memory configured to store a microcode instruction set.

The network processor 200 may be in a form of hardware or a combination of software and hardware. For example, the network processor 200 may be a forwarding chip. Each microcode processor may also be in a form of hardware or a combination of software and hardware. Each microcode processor may include a corresponding processing module and a corresponding storage module. The storage module may also be considered as a storage space, and is configured to store a microcode instruction set, and the processing module is configured to execute the microcode instruction set, so that the network processor implements one or more service functions. Each of the microcode processors may have a corresponding storage module, or a plurality of microcode processors may share a same storage module. For example, the microcode processor 201 and the microcode processor 202 share one storage module.

One or more of the storage module of the microcode processor 201, the storage module of the microcode processor 202, the storage module of the microcode processor 203, and the external memory 400 may be a random access memory (RAM), a flash, a read-only memory (ROM), an erasable programmable read-only memory (EPROM), an electrically erasable programmable read-only memory (EEPROM), or a register. In some embodiments, the memory 400 may be a hard disk, a removable hard disk, a CD-ROM, or any other form of storage medium known by a person skilled in the art.

In this embodiment of this application, to reduce load of the storage space of each of the microcode processors, a microcode instruction set is stored in the memory 400. When one or more of the microcode processors need to enable a service function, the central processing unit 300 may write a microcode instruction set corresponding to the service function instead of writing all microcode instruction sets into an unused storage space of a corresponding target microcode processor. This can reduce a storage space of a microcode processor that needs to be occupied by a microcode instruction set.

In some embodiments, the network processor 200, the central processing unit 300, and the memory 400 may be in one device, that is, the device 100, or may be distributed in different devices. Alternatively, two of the network processor, the central processing unit, and the memory belong to a same device, and the other one belongs to another device. For example, the network processor 200 and the central processing unit 300 belong to one device, and the memory 400 belongs to another device; or the central processing unit 300 and the memory 400 belong to one device, and the network processor 200 is an independent device. This is not specifically limited in this application.

Figure 2:
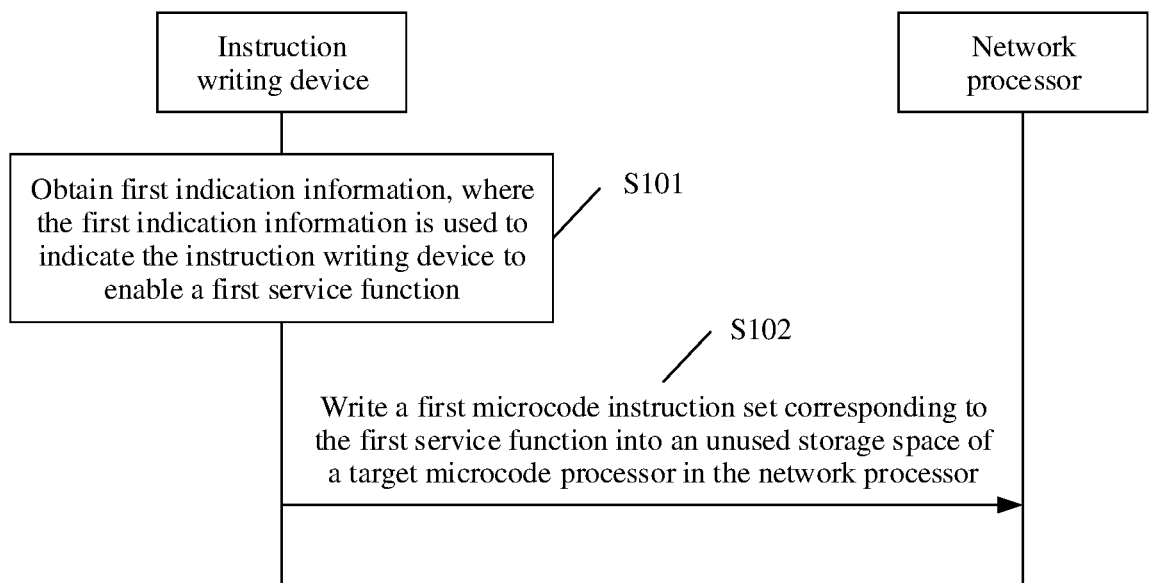
FIG. 2 is a flowchart of an instruction writing method according to an embodiment of this application.

FIG. 2 is a flowchart of an instruction writing method according to an embodiment of this application.

With reference to FIG. 1 and FIG. 2, the following describes the instruction writing method provided in this embodiment of this application. The method includes the following steps.

S101: An instruction writing device obtains first indication information.

In this embodiment of this application, the instruction writing device is, for example, the device 100 including the central processing unit 300 in the embodiment shown in FIG. 1, or another device that has instruction writing and processing capabilities, for example, a device including another instruction processing apparatus (as mentioned above) that can replace the central processing unit 300. In some embodiments, the instruction writing device may be a device similar to the device 100. The device and a network processor may be in different devices, or may be integrated into a same device.

In this embodiment of this application, the first indication information is used to indicate the instruction writing device to enable a first service function. The indication for enabling the first service function enables the instruction writing device to learn that an object (for example, a service user) that sends the first indication information needs to start or use the first service function, and enables the instruction writing device to obtain a first microcode instruction set corresponding to the first service function. For the network processor, the instruction writing device enables the first service function, so that the network processor can have the first service function by executing the first microcode instruction set that is written by the instruction writing device and that corresponds to the first service function. In other words, the first indication information indicates to enable the first service function, so that the network processor has the first service function. The network processor may be the network processor 200 in the embodiment shown in FIG. 1.

In this embodiment of this application, a service function is a function implemented by the network processor, for example, a receiving function, a sending function, or an internet protocol (Internet Protocol, IP) packet processing function. In a possible case shown in this embodiment of this application, the first service function may include at least one of a necessary service function and an optional service function. The necessary service function is a service function necessary for the network processor to run, for example, layer-2 packet forwarding. The optional service function is a service function optional for the network processor to run, for example, an Ethernet operations, administration, and maintenance (EOAM) Y.1731 feature, a service function of transmitting an internet protocol version 6 (IPv6) packet in an internet protocol version 4 (IPv4) network, or a service function of sampling a data flow.

In a possible case, the first indication information may be obtained through triggering by a user. After obtaining a command that is entered by the user and that is used to enable the first service function, the instruction writing device may analyze the command, and determine the first service function corresponding to the command.

In another possible case, the first indication information may include instruction code that is pre-stored in the instruction writing device. Specifically, the instruction writing device may establish a correspondence between the first indication information and the first service function. The instruction code may be triggered by the user by entering a command line, or may be automatically triggered by the instruction writing device. For example, an executable program includes the instruction code, and when the executable program is run, the instruction code is automatically triggered. In response to the instruction code, the instruction writing device may enable the first service function indicated by the first indication information.

In another possible case, a specific form is not limited, provided that the first service function can be determined based on the first indication information.

S102: The instruction writing device writes the first microcode instruction set corresponding to the first service function into an unused storage space of a target microcode processor in the network processor.

In this embodiment of this application, S102 may be considered as a specific implementation in which the instruction writing device enables the first service function.

After determining the first service function based on the first indication information, the instruction writing device may obtain, from a memory, the corresponding first microcode instruction used to implement the first service function. The memory may be the memory 400 in the embodiment shown in FIG. 1. The memory 400 may be inside the instruction writing device, or may be outside the instruction writing device.

In this embodiment of this application, the first microcode instruction set includes at least one microcode instruction. When a microcode processor into which the first microcode instruction set is written executes the at least one microcode instruction in the first microcode instruction set, the microcode processor may implement the first service function corresponding to the first microcode instruction set. A microcode instruction is an instruction that can implement one or more service functions when a microcode processor executes the microcode instruction. In this embodiment of this application, an instruction set used to implement a necessary service function may be referred to as a necessary instruction set. For example, the necessary instruction set may be written into the network processor after the instruction writing device is powered on. An instruction set used to implement an optional service function may be referred to as an optional instruction set. The optional instruction set may be written into the network processor according to a service requirement at a power-on time or another time. The necessary instruction set includes one or more necessary microcode instructions, and the optional instruction set includes one or more optional microcode instructions. In a possible case, an instruction set stored in a storage space of each microcode processor in the network processor may include one necessary instruction set and at least one optional instruction set. In another possible case, each microcode processor in the network processor may not include a necessary instruction set. In another possible case, some microcode processors in the network processor may include a necessary instruction set, and the other microcode processors do not include a necessary instruction set. The some microcode processors including a necessary instruction set may be determined based on a specific service function that needs to be implemented.

In this embodiment of this application, each instruction set may have a corresponding identifier. After determining the first service function corresponding to the first indication information, the instruction writing device may search a correspondence between a first service function and an identifier of a first microcode instruction set to obtain the identifier of the first microcode instruction set corresponding to the first service function.

Table 1 is an example of the correspondence between a service function and an identifier of a first microcode instruction set.

TABLE 1

| Service function | | Identifier of the first microcode instruction set |
|---|---|---|
| Basic service function | | BI |
| Dynamic service function | EOAM Y.1731 feature | DI-1 |
| | Transmitting an IPv6 packet in an IPv4 network | DI-2 |
| | Sampling a data flow | DI-3 |

In a possible case, one microcode instruction set identifier may correspond to one service function, or may correspond to a plurality of service functions. For example, it is assumed that a microcode instruction set corresponding to a service function 1 includes a microcode instruction subset A and a microcode instruction subset B, and a microcode instruction set corresponding to a service function 2 includes a microcode instruction subset C and the microcode instruction subset B. In other words, the service function 1 and the service function 2 share the same microcode instruction subset B. If an identifier of the microcode instruction subset A is DI-a-1, an identifier of the microcode instruction subset B is DI-a-2, and an identifier of the microcode instruction subset C is DI-b-1, an identifier of the microcode instruction set corresponding to the service function 1 includes DI-a-1 and DI-a-2, and an identifier of the microcode instruction set identifier corresponding to the service function 2 includes DI-b-1 and DI-a-2. In this case, the microcode instruction set identifier DI-a-2 corresponds to both a service function 1 and a service function 2. In another possible case, one microcode instruction set may have one identifier, or may have a plurality of identifiers. For example, when the microcode instruction subset B corresponds to both the service function 1 and the service function 2, different identifiers may be separately allocated to the microcode instruction subset B corresponding to the service function 1 and the microcode instruction subset B corresponding to the service function 2, and two corresponding correspondences are separately stored in Table 1.

After obtaining the identifier of the first microcode instruction set, the instruction writing device may obtain, from the memory based on the identifier of the first microcode instruction set, the first microcode instruction set corresponding to the identifier of the first microcode instruction set. The memory stores a correspondence between the identifier of the first microcode instruction set and the first microcode instruction set.

In some possible implementations, a microcode instruction set corresponding to a service function may be determined in another manner. For example, when a microcode instruction set is relatively frequently reused in different service functions, bit strings corresponding to all microcode instruction sets may be preset, and a correspondence between a service function and a corresponding set bit string is stored. Each bit corresponds to one microcode instruction set. In this way, in response to the enabling of the first service function, the first microcode instruction set used to implement the first service function may be determined based on a correspondence between the first service function and a corresponding set bit string.

After obtaining the first microcode instruction set, the instruction writing device writes the first microcode instruction set into the unused storage space of the target microcode processor. A size of the unused storage space is greater than or equal to a size of the first microcode instruction set. In this embodiment of this application, the target microcode processor may be, for example, one or more of the microcode processor 201, the microcode processor 202, and the microcode processor 203 shown in FIG. 1.

When the network processor includes m microcode processors, the instruction writing device may separately write the first microcode instruction set into unused storage spaces of n microcode processors in the m microcode processors, where m≥n≥1, m is a positive integer greater than or equal to 1, and n is a positive integer greater than or equal to 1. When n>1, the first microcode instruction set is written into a plurality of microcode processors, so that execution efficiency of the first service function can be improved.

In some embodiments, the network processor includes a plurality of microcode processors, and the instruction writing device may write the obtained first microcode instruction set into some or all of the plurality of microcode processors. The first microcode instruction set may be a necessary instruction set, or may be an optional instruction set. The some or all of the microcode processors include the target microcode processor.

In some embodiments, if the first microcode instruction set is written into some microcode processors, for example, for storage spaces of the m microcode processors, storage spaces of one or more specific microcode processors into which the first microcode instruction set is written in the storage spaces of the m microcode processors may be preconfigured, or may be determined in real time or in non-real time based on storage statuses of the storage spaces of the m microcode processors.

For the preconfiguration, the instruction writing device may determine, based on the identifier of the first microcode instruction set and a correspondence between the identifier of the first microcode instruction set and an identifier of a microcode processor, an identifier of the target microcode processor corresponding to the identifier of the first microcode instruction set.

Table 2 is Example 1 of a correspondence between the identifier of the first microcode instruction set and the identifier of the target microcode processor in the embodiment shown in FIG. 1.

TABLE 2

| Identifier of the first microcode instruction set | Identifier of the target microcode processor |
|---|---|
| BI | 201, 202, and 203 |
| DI-1 | 201 and 202 |
| DI-2 | 202 and 203 |
| DI-3 | 201, 202, and 203 |

Table 3 is Example 2 of the correspondence between the identifier of the first microcode instruction set and the identifier of the target microcode processor in the embodiment shown in FIG. 1.

TABLE 3

| Identifier of the target microcode processor | Identifier of the first microcode instruction set |
|---|---|
| 201 | BI, DI-1, and DI-3 |
| 202 | BI, DI-1, DI-2 and DI-3 |
| 203 | BI, DI-2, and DI-3 |

In some embodiments, the instruction writing device may further determine, in real time or in non-real time based on sizes of unused storage spaces of one or more microcode processors, the target microcode processor corresponding to the first microcode instruction set. Specifically, the instruction writing device may obtain sizes of unused storage spaces of one or more microcode processors in the m microcode processors; and the instruction writing device may determine one or more microcode processors from the m microcode processors as the target microcode processor based on the size of the first microcode instruction set and the sizes of the unused storage spaces of the one or more microcode processors. The size of the unused storage space in a storage space of the target microcode processor is greater than or equal to the size of the instruction set, to be specific, the unused storage space of the target microcode processor should be large enough for the first instruction set to write. In some cases, the one or more microcode processors may be some microcode processors in the network processor. For example, after obtaining unused storage spaces of some microcode processors in the network processor, the instruction writing device finds a microcode processor whose unused storage space is large enough for the first instruction set to write. In this case, the instruction writing device determines that the microcode processor whose storage space is large enough is the target microcode processor.

For example, assuming that the size of the first microcode instruction set corresponding to the first service function is 20 megabytes (MB), and sizes of unused storage spaces of the microcode processor 201, the microcode processor 202, and the microcode processor 203 are respectively 15 MB, 25 MB, and 40 MB, the instruction writing device may determine the microcode processor 202 and/or the microcode processor 203 as the target microcode processor, and write the first microcode instruction set into the storage space of the target microcode processor.

In this embodiment of this application, the first microcode instruction set may include a plurality of first microcode instruction subsets, and each of the plurality of first microcode instruction subsets is used to implement one first service sub-function.

For example, the first microcode instruction set includes a microcode instruction subset 1, a microcode instruction subset 2, and a microcode instruction subset 3. The microcode instruction subset 1 is used to implement a service sub-function 1, the microcode instruction subset 2 is used to implement a service sub-function 2, and the microcode instruction subset 3 is used to implement a service sub-function 3. In this embodiment of this application, the microcode instruction subset 1, the microcode instruction subset 2, and the microcode instruction subset 3 are integrated into one microcode instruction set and loaded together into the target microcode processor. In some embodiments, the microcode instruction subset 1, the microcode instruction subset 2, and the microcode instruction subset 3 are separately loaded into the target microcode processor.

As described above, there may be a plurality of microcode processors in the network processor. In a possible implementation, the instruction writing device separately writes the first microcode instruction set into storage spaces of the plurality of microcode processors, and the plurality of microcode processors include the target microcode processor. For example, the instruction writing device writes the necessary instruction set BI and the optional instruction sets DI-1, DI-2, and DI-3 into a storage space of the microcode processor 201, a storage space of the microcode processor 202, and a storage space of the microcode processor 203.

In a possible implementation, the instruction writing device writes a necessary instruction set and at least one optional instruction set into the storage space of each of the microcode processors. In addition, optional instruction sets that are written into the storage spaces of the microcode processors may be different. For example, in addition to writing the necessary instruction set BI into each of the storage space of the microcode processor 201, the storage space of the microcode processor 202, and the storage space of the microcode processor 203, the instruction writing device further writes the optional instruction sets DI-1, DI-2, and DI-3 into the storage space of the microcode processor 201, further writes optional instruction sets DI-4, DI-5, and DI-6 into the storage space of the microcode processor 202, and further writes optional instruction sets DI-7, DI-8, and DI-9 into the storage space of the microcode processor 203.

In another possible implementation, the instruction writing device writes a necessary instruction set and at least one optional instruction set into the storage space of each of the microcode processors. In addition, optional instruction sets that are written into the storage spaces of the microcode processors are partially the same. For example, in addition to writing the necessary instruction set BI into each of the storage space of the microcode processor 201, the storage space of the microcode processor 202, and the storage space of the microcode processor 203, the instruction writing device further writes the optional instruction sets DI-1, DI-2, and DI-3 into the storage space of the microcode processor 201, further writes the optional instruction sets DI-1, DI-2, and DI-4 into the storage space of the microcode processor 202, and further writes the optional instruction sets DI-1, DI-2, and DI-5 into the storage space of the microcode processor 203.

For the three possible implementations, an instruction set that is written into each microcode processor in the network processor may not include a necessary instruction set, or an instruction set that is written into some microcode processors in the network processor may not include a necessary instruction set. This is not specifically limited in this embodiment of this application.

The three implementations are merely examples, and do not constitute a limitation on only implementations of the technical solutions in this application.

Optionally, the instruction writing device may store location information of the first microcode instruction set in the unused storage space of the target microcode processor into which the first microcode instruction set is written for subsequent use. The location information of the first microcode instruction set in the storage space of the target microcode processor may include a start address of the first microcode instruction set in the storage space of the target microcode processor and the size of the first microcode instruction set, or may include a start address and an end address of the first microcode instruction set in the storage space of the target microcode processor. The instruction writing device may store the location information of the first microcode instruction set by using a linked list or the like. This is not specifically limited in this embodiment of this application.

When the first microcode instruction set includes a plurality of first microcode instruction subsets, the instruction writing device may store location information of each of the plurality of first microcode instruction subsets in the storage space of the target microcode processor by using a linked list or the like.

In this embodiment of this application, the instruction writing device obtains the first indication information used to enable the first service function of the network processor, determines the first service function corresponding to the first indication information, obtains the first microcode instruction set corresponding to the first service function, and writes the first microcode instruction set into the unused storage space of the target microcode processor in the network processor. In this embodiment of this application, the instruction writing device writes the corresponding first microcode instruction set into the unused storage space of the target microcode processor according to a requirement for the first service function, instead of writing all available microcode instruction sets into a storage space of the microcode processor. Therefore, a requirement for the storage space of the target microcode processor is relatively low, and costs are also relatively low. In some embodiments, a plurality of microcode instruction sets that are used to implement corresponding service functions are loaded into one microcode processor at different moments as required. This can also achieve an objective of flexibly using a remaining storage space of the target microcode processor, and improve utilization efficiency of a storage space of the network processor.

Optionally, the following steps S104 and S105 may be further performed in this embodiment of this application.

S104: The instruction writing device obtains second indication information.

In this embodiment of this application, the second indication information is used to indicate the instruction writing device to disable the first service function. The disabling is to notify, based on the second indication information, the instruction writing device that the network processor does not need to implement the first service function currently.

S105: The instruction writing device unloads the first microcode instruction set from the target microcode processor based on the second indication information.

In this embodiment of this application, S105 may be considered as a specific implementation in which the instruction writing device disables the first service function. That the target microcode processor unloads the first microcode instruction set means that the target microcode processor deletes or allows to overwrite the first microcode instruction set in the storage space. By unloading the first microcode instruction set corresponding to the first service function that is not required, the storage space of the target microcode processor can be saved, to store another microcode instruction set as required.

Optionally, if the instruction writing device stores the location information of the first microcode instruction set in the storage space of the target microcode processor, the instruction writing device may unload the first microcode instruction set based on the location information of the first microcode instruction set, and may delete or replace the location information of the first microcode instruction set.

Optionally, the first microcode instruction set includes a jump instruction. S102 may be specifically implemented by performing the following steps S106 to S108 in this embodiment of this application.

S106: The instruction writing device obtains a first start address of the first microcode instruction set that is allowed to be written into the storage space of the target microcode processor.

In this embodiment of this application, the first start address of the first microcode instruction set is a start address for writing or reading the first microcode instruction set.

One or more microcode instruction sets may be written into the storage space of the target microcode processor, and the one or more microcode instruction sets include the first microcode instruction set. When a plurality of microcode instruction sets are written, the start address of the first microcode instruction set in the storage space of the target microcode processor is not necessarily a start address of the storage space of the target microcode processor. The first microcode instruction set includes the jump instruction. The jump instruction is an instruction used to perform a jump operation. The jump operation may be jumping to execute a microcode instruction in a microcode instruction set. The jump instruction includes a jump address. The jump address represents an address to which the jump instruction jumps, and the address is an address in the storage space of the target microcode processor. When executing the jump instruction, the target microcode processor jumps to a corresponding storage location based on the jump address to read a corresponding microcode instruction. Therefore, the jump address needs to match an actual storage location of the jump instruction in the storage space of the microcode processor. Otherwise, an incorrect microcode instruction is read.

In some embodiments, the jump address of the jump instruction is determined by default based on the start address of the storage space of the target microcode processor and a relative offset address of the jump instruction in the first microcode instruction set. If the start address of the first microcode instruction set in the storage space of the target microcode processor is not the start address of the storage space of the target microcode processor, the jump address needs to be modified, so that the target microcode processor can jump to a corresponding microcode instruction based on a modified jump address for execution. Specifically, the instruction writing device may perform S107 and S108.

S107: The instruction writing device determines the jump address of the jump instruction in the storage space based on the relative offset address of the jump address of the jump instruction in the first microcode instruction set and the first start address.

For example, assuming that the first start address of the first microcode instruction set is the $100^{th}$ byte, and the relative offset address of the jump address of the jump instruction in the first microcode instruction set is 10 bytes, the jump address of the jump instruction in the storage space is the $110^{th}$ byte.

S108: The instruction writing device writes the jump instruction into the target microcode processor based on the jump address of the jump instruction in the storage space.

There are two possible implementations in which the instruction writing device writes the jump instruction.

1. The instruction writing device has not written the first microcode instruction set. In this case, the instruction writing device writes the first microcode instruction set that includes the jump instruction in S108 into the target microcode processor.

2. The instruction writing device has written the first microcode instruction set, but the jump address of the jump instruction in the first microcode instruction set is obtained based on the relative offset address of the jump address in the first microcode instruction set and the start address of the storage space, in other words, the start address of the first microcode instruction set in the storage space is not considered. In this case, the jump address is an incorrect jump address. Therefore, the instruction writing device replaces an original jump instruction that includes the incorrect jump address with the jump instruction in S108. This implements correct jump instruction writing.

The instruction writing device in this embodiment of this application may re-determine a jump address of the jump instruction in the first microcode instruction set, so that the jump instruction can be correctly executed, and can jump to a correct microcode instruction for execution. This ensures an execution success rate of the first microcode instruction set.

Moreover, the jump instruction may be further used to jump to a microcode instruction of another microcode instruction set in addition to the first microcode instruction set, for example, a fourth microcode instruction set. In this case, the instruction writing device may obtain a first start address of the fourth microcode instruction set that is allowed to be written into the storage space of the target microcode processor, and may determine the jump address of the jump instruction in the storage space based on the relative offset address of the jump address of the jump instruction in the fourth microcode instruction set and the first start address of the fourth microcode instruction set.

Then, the instruction writing device writes the jump instruction into the target microcode processor based on the jump address of the jump instruction in the storage space.

Optionally, the following steps S109 to S111 may be further performed in this embodiment of this application.

S109: The instruction writing device obtains third indication information, where the third indication information is used to indicate the instruction writing device to enable a second service function.

In this embodiment of this application, the second service function is different from the first service function. For a manner in which the instruction writing device obtains the third indication information, refer to the descriptions of the manner of obtaining the first indication information. Details are not described herein again.

In a possible case, indication information obtained by the instruction writing device may be merely used to indicate to enable a service function. For example, the third indication information is used to indicate to enable the second service function. Enabling or disabling of another service function needs to be indicated by using other indication information. For example, when the second service function is enabled by using the third indication information, the first service function is further disabled by using the second indication information.

In another possible case, indication information obtained by the instruction writing device is used to indicate that only one or more service functions need to be enabled currently. In this case, that the indication information indicates to enable one or more service functions is further equivalent to indicating to disable one or more other loaded service functions. For example, when the second service function is enabled by using the third indication information, the first service function that is first enabled based on the first indication information further needs to be disabled. In this case, it may be actually understood that the indication information is used to indicate to enable a service function mode, and the service function mode corresponds to a set of a plurality of service functions. When obtaining new indication information, the instruction writing device switches a previous service function mode to a new service function mode in response to the new indication information.

S110: The instruction writing device determines, based on the third indication information, a second microcode instruction set corresponding to the second service function.

In this embodiment of this application, a specific implementation in which the instruction writing device determines the second microcode instruction set corresponding to the second service function is similar to the foregoing specific implementation of determining the first microcode instruction set corresponding to the first service function. Details are not described herein again.

In this embodiment of this application, the second microcode instruction set includes a plurality of second microcode instruction subsets. Each second microcode instruction subset may correspond to one second service sub-function. The second service sub-function herein is relative to the second service function, and may be actually a complete and independent service function. In this case, a relationship between the second service function and the second service sub-function is actually a relationship between a service function set and one service function in the service function set. There may be an intersection between the plurality of first microcode instruction subsets included in the first microcode instruction set and the plurality of second microcode instruction subsets included in the second microcode instruction set. If there is an intersection, the following step S111 may be performed.

S111: The instruction writing device compares the plurality of first microcode instruction subsets with the plurality of second microcode instruction subsets, and unloads one or more third microcode instruction subsets.

In this embodiment of this application, the one or more third microcode instruction subsets are microcode instruction subsets that are in the plurality of first microcode instruction subsets and that do not belong to the second microcode instruction subsets. The instruction writing device unloads the one or more third microcode instruction subsets to retain a microcode instruction subset that is in the first microcode instruction set and that is the same as the second microcode instruction subset. This can save a time for writing the second microcode instruction set into the target microcode processor, and improve writing efficiency. For example, when the instruction writing device needs to switch, based on the indication of the third indication information, a service function mode corresponding to the first microcode instruction set to a new service function mode indicated by the third indication information, the instruction writing device may compare a difference between the first microcode instruction set and the second microcode instruction set, and unload only some different instruction sets in a possible case.

In a specific example, the first microcode instruction set includes the following three first microcode instruction subsets: the necessary instruction set BI, the optional instruction set DI-1, and the optional instruction set DI-2, and the second microcode instruction set includes the following three second microcode instruction subsets: the necessary instruction set BI, the optional instruction set DI-2, and the optional instruction set DI-3. In this case, the instruction writing device may unload the optional instruction set DI-1 in the first microcode instruction set, and load the optional instruction set DI-3, to implement an effect of unloading the first microcode instruction set and loading the second microcode instruction set, and improve efficiency of writing the second microcode instruction set.

In some embodiments, the instruction writing device may further unload all the first microcode instruction sets, and write the second microcode instruction set. This manner is not only applicable to a case in which there is an intersection between the first microcode instruction subset and the second microcode instruction subset, but also applicable to a case in which there is no intersection set.

Optionally, the following step S112 may be further performed in this embodiment of this application.

S112: Optionally, the instruction writing device organizes a plurality of fragment storage spaces of the target microcode processor to obtain the unused storage space, where the size of the unused storage space is equal to a sum of sizes of the plurality of fragment storage spaces.

When there are a plurality of microcode instruction sets stored in the storage space of the target microcode processor, deleting one or more of the plurality of microcode instruction sets may make idle storage spaces in the storage space of the target microcode processor discontinuous. To enable the storage space of the target microcode processor to be large enough to store another microcode instruction set, the instruction writing device may "organize" the discontinuous storage spaces in the storage space of the target microcode processor.

In a possible implementation, before the instruction writing device writes the first microcode instruction set into the unused storage space, the storage space of the target microcode processor stores the fourth microcode instruction set and a fifth microcode instruction set. The instruction writing device may store location information of the fourth microcode instruction set in the storage space and location information of the fifth microcode instruction set in the storage space. The location information of the fourth microcode instruction set in the storage space includes an end address of the fourth microcode instruction set, and the location information of the fifth microcode instruction set in the storage space includes a second start address of the fifth microcode instruction set in the target microcode processor. The end address is less than the second start address.

When a storage space between the fourth microcode instruction set and the fifth microcode instruction set is not occupied, the instruction writing device obtains the end address of the fourth microcode instruction set in the target microcode processor and the second start address of the fifth microcode instruction set in the target microcode processor. The instruction writing device modifies the start address of storing the fifth microcode instruction set to an updated second start address. The updated second start address is between the end address and the to-be-updated second start address. Specifically, the instruction writing device unloads the fifth microcode instruction set, and writes the fifth microcode instruction set based on the updated second start address.

Figure 3A:
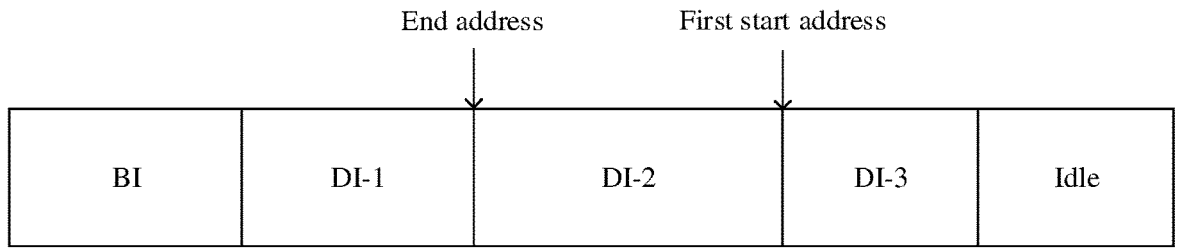
FIG. 3(a) is a first schematic diagram of a microcode instruction set stored in a storage space of a target microcode processor according to an embodiment of this application.
Figure 3B:
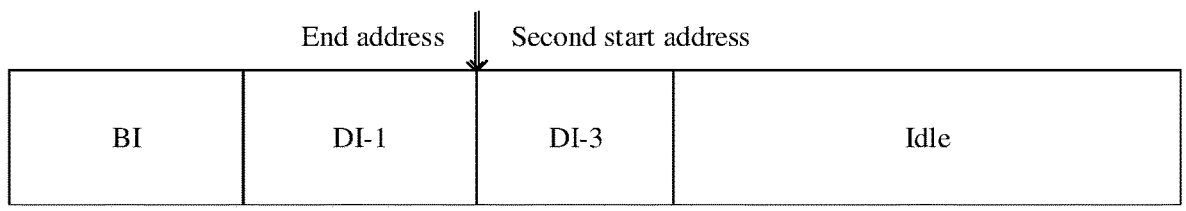
FIG. 3(b) is a second schematic diagram of a microcode instruction set stored in a storage space of a target microcode processor according to an embodiment of this application.

For example, FIG. 3(a) and FIG. 3(b) are schematic diagrams of microcode instruction sets stored in the storage space of the target microcode processor.

In FIG. 3(a), the storage space of the target microcode processor stores the necessary instruction set BI and the optional instruction sets DI-1, DI-2, and DI-3. In addition, the storage space of the target microcode processor further has a segment of idle storage space after the optional instruction set DI-3. Assuming that the optional instruction set DI-2 is deleted, there is an idle storage space between the optional instruction sets DI-1 and DI-3, and the idle storage space is discontinuous with the storage space after DI-3. To effectively use this part of storage space, the instruction writing device may determine that an address obtained by adding N (for example, N is 1 byte) to an end address of DI-1 is a new start address of the optional instruction set DI-3. In addition, the instruction writing device deletes the optional instruction set DI-3 from the storage space of the target microcode processor, and rewrites the optional instruction set DI-3 into the storage space of the target microcode processor based on the new start address of the optional instruction set DI-3. After the instruction writing device deletes and rewrites a corresponding instruction set, the two segments of idle storage spaces become one segment of continuous storage space. As shown in FIG. 3(b), this segment of storage space may be used to store another microcode instruction set. This implements effective storage space use.

In another possible implementation, before the instruction writing device writes the first microcode instruction set into the unused storage space, the target microcode processor includes the fourth microcode instruction set and a fifth microcode instruction set. The instruction writing device may store location information of the fourth microcode instruction set in the storage space and location information of the fifth microcode instruction set in the storage space. The location information of the fourth microcode instruction set in the storage space includes a third start address of the fourth microcode instruction set and a length of a storage space occupied by the fourth microcode instruction, and the location information of the fifth microcode instruction set in the storage space includes a second start address of the fifth microcode instruction set in the target microcode processor. The third start address of the fourth microcode instruction set is less than the second start address.

When a storage space between the fourth microcode instruction set and the fifth microcode instruction set is not occupied, the instruction writing device obtains the length of the storage space occupied by the fourth microcode instruction set and the second start address of the fifth microcode instruction set in the target microcode processor.

The instruction writing device determines an updated third start address of the fourth microcode instruction set based on the start address of the fifth microcode instruction set and the length of the storage space occupied by the fourth microcode instruction set. The updated third start address is between the to-be-updated third start address and the second start address. The instruction writing device modifies the start address of storing the fourth microcode instruction set to the updated third start address. Specifically, the instruction writing device unloads the fourth microcode instruction set, and writes the fourth microcode instruction set based on the updated third start address.

Figure 4A:
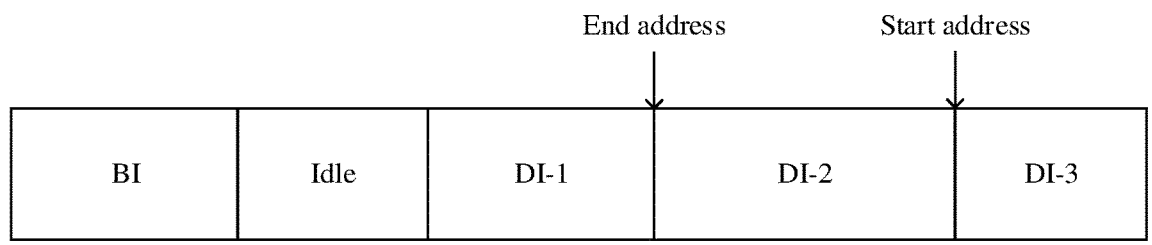
FIG. 4(a) is a third schematic diagram of a microcode instruction set stored in a storage space of a target microcode processor according to an embodiment of this application.
Figure 4B:
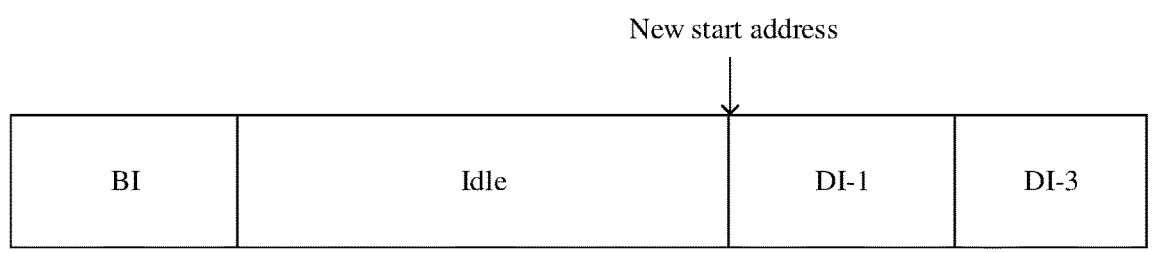
FIG. 4(b) is a fourth schematic diagram of a microcode instruction set stored in a storage space of a target microcode processor according to an embodiment of this application.

For example, FIG. 4(a) and FIG. 4(b) are schematic diagrams of microcode instruction sets stored in the storage space of the target microcode processor.

In FIG. 4(a), the storage space of the target microcode processor stores the necessary instruction set BI and the optional instruction sets DI-1, DI-2, and DI-3. In addition, the storage space of the target microcode processor further has a segment of idle storage space between the necessary instruction set BI and the optional instruction set DI-1. Assuming that the optional instruction set DI-2 is deleted, there is an idle storage space between the optional instruction sets DI-1 and DI-3, and the idle storage space is discontinuous with the storage space between the necessary instruction set BI and the optional instruction set DI-1. To effectively use this part of storage space, the instruction writing device may determine that an address obtained by subtracting a length of the optional instruction set DI-1 from a start address of the optional instruction set DI-3 is a new start address of the optional instruction set DI-1. In addition, the instruction writing device deletes the optional instruction set DI-1 from the storage space of the target microcode processor in the network processor, and writes the optional instruction set DI-1 into the storage space of the target microcode processor based on the new start address of the optional instruction set DI-1. After the deletion and rewriting, the two segments of idle storage spaces become one segment of continuous storage space. As shown in FIG. 4(b), this segment of storage space may be used to store another microcode instruction set. This implements effective storage space use.

For a time of organizing fragment storage spaces, in a possible case, when finding that a quantity of storage spaces whose space sizes each are less than a threshold reaches a specific quantity, the instruction writing device organizes a plurality of fragment storage spaces. In another possible case, when finding that the size of the to-be-written first microcode instruction set is greater than a size of any idle storage space of a microcode processor, the instruction writing device organizes a plurality of fragment storage spaces. After the organization, the instruction writing device may obtain an unused storage space into which the first microcode instruction set can be written, to write the first microcode instruction set.

Figure 5:
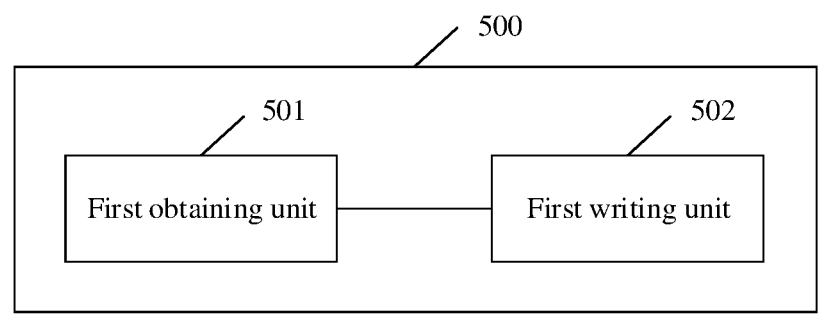
FIG. 5 is a schematic diagram of a structure of an instruction writing apparatus 500 according to an embodiment of this application.

Refer to FIG. 5. An embodiment of this application provides an instruction writing apparatus 500. The apparatus 500 is configured to implement functions of the instruction writing device in the embodiment shown in FIG. 2. The apparatus 500 includes a first obtaining unit 501 and a first writing unit 502. The first obtaining unit 501 is configured to perform S101 in the embodiment shown in FIG. 2, and the first writing unit 502 is configured to perform S102 in the embodiment shown in FIG. 2.

Specifically, the first obtaining unit 501 is configured to obtain first indication information, where the first indication information is used to indicate the instruction writing device to enable a first service function. The first writing unit 502 is configured to write a first microcode instruction set corresponding to the first service function into an unused storage space of a target microcode processor in a network processor, where a size of the unused storage space is greater than or equal to a size of the first microcode instruction set.

Optionally, the network processor includes one or more microcode processors, and the apparatus 500 further includes: a first determining unit, configured to determine the target microcode processor based on one or more unused storage spaces respectively included in the one or more microcode processors and the size of the first microcode instruction set, where the one or more microcode processors belong to the network processor, the one or more microcode processors include the target microcode processor, and the size of the unused storage space of the target microcode processor is greater than or equal to the size of the first microcode instruction set.

Optionally, the apparatus 500 further includes: a second obtaining unit, configured to perform S104 in the embodiment shown in FIG. 2, and specifically configured to obtain second indication information, where the second indication information is used to indicate the writing device to disable the first service function; and a first unloading unit, configured to perform S105 in the embodiment shown in FIG. 2, and specifically configured to unload the first microcode instruction set from the target microcode processor based on the second indication information.

Optionally, the network processor includes a plurality of microcode processors.

The first writing unit is configured to write the first microcode instruction set into each of the plurality of microcode processors, where the plurality of microcode processors include the target microcode processor.

Optionally, the first microcode instruction set includes a plurality of first microcode instruction subsets, and each of the plurality of first microcode instruction subsets is used to implement one first service sub-function.

Optionally, the apparatus 500 further includes: a third obtaining unit, configured to perform S109 to S111 in the embodiment shown in FIG. 2, and specifically configured to obtain third indication information, where the third indication information is used to indicate the instruction writing device to enable a second service function; a second determining unit, configured to determine a second microcode instruction set corresponding to the second service function, where the second microcode instruction set includes a plurality of second microcode instruction subsets; and a second unloading unit, configured to: compare the plurality of first microcode instruction subsets with the plurality of second microcode instruction subsets, and unload one or more third microcode instruction subsets, where the one or more third microcode instruction subsets belong to the plurality of first microcode instruction subsets, but do not belong to the plurality of second microcode instruction subsets.

Optionally, the first microcode instruction set includes a jump instruction.

The first writing unit 502 is configured to perform S106 to S108 in the embodiment shown in FIG. 2, and is specially configured to: obtain a first start address of the first microcode instruction set that is allowed to be written into a storage space of the target microcode processor; determine a jump address of the jump instruction in the storage space based on a relative offset address of a jump address of the jump instruction in the first microcode instruction set and the first start address, where the jump instruction is an instruction used to perform a jump operation; and write the jump instruction into the target microcode processor based on the jump address of the jump instruction in the storage space.

Optionally, the apparatus 500 further includes: an organization unit, configured to perform S112 in the embodiment shown in FIG. 2, and specifically configured to organize a plurality of fragment storage spaces of the target microcode processor to obtain the unused storage space, where the size of the unused storage space is equal to a sum of sizes of the plurality of fragment storage spaces.

Optionally, before the instruction writing device writes the first microcode instruction set into the unused storage space, the storage space of the target microcode processor stores a fourth microcode instruction set and a fifth microcode instruction set. The organization unit is configured to: when a storage space between the fourth microcode instruction set and the fifth microcode instruction set is not occupied, obtain an end address of the fourth microcode instruction set in the target microcode processor and a second start address of the fifth microcode instruction set in the target microcode processor, where the end address is less than the second start address; and modify the start address of storing the fifth microcode instruction set to an updated second start address, where the updated second start address is between the end address and the to-be-updated second start address.

Optionally, before the instruction writing device writes the first microcode instruction set into the unused storage space, the target microcode processor includes a fourth microcode instruction set and a fifth microcode instruction set. The organization unit is configured to: when a storage space between the fourth microcode instruction set and the fifth microcode instruction set is not occupied, obtain a third start address of the fourth microcode instruction set, a length of a storage space occupied by the fourth microcode instruction set, and a second start address of the fifth microcode instruction set in the target microcode processor, where the third start address of the fourth microcode instruction set is less than the second start address; determine an updated third start address of the fourth microcode instruction set based on the start address of the fifth microcode instruction set and the length of the storage space occupied by the fourth microcode instruction set, where the updated third start address is between the to-be-updated third start address and the second start address; and modify the start address of storing the fourth microcode instruction set to the updated third start address.

Optionally, the apparatus 500 further includes: a second writing unit, configured to: before the first writing unit writes the first microcode instruction set corresponding to the first service function into the unused storage space of the target microcode processor in the network processor, when the network processor is powered on, write a necessary instruction set into the unused storage space of the target microcode processor in the network processor.

It should be understood that a function performed by one function unit or a function jointly completed by a plurality of function units in the instruction writing apparatus 500 may be implemented by software, or may be implemented by using one or more entity components. For example, functions executed by the first obtaining unit, the second obtaining unit, and the first determining unit may be completed by a processor, and the first microcode instruction set written by the first writing unit may be sent to the network processor and written through a communications interface. For other content of the instruction writing apparatus 500, refer to the foregoing descriptions of the instruction writing device. Details are not described herein again.

Figure 6A:
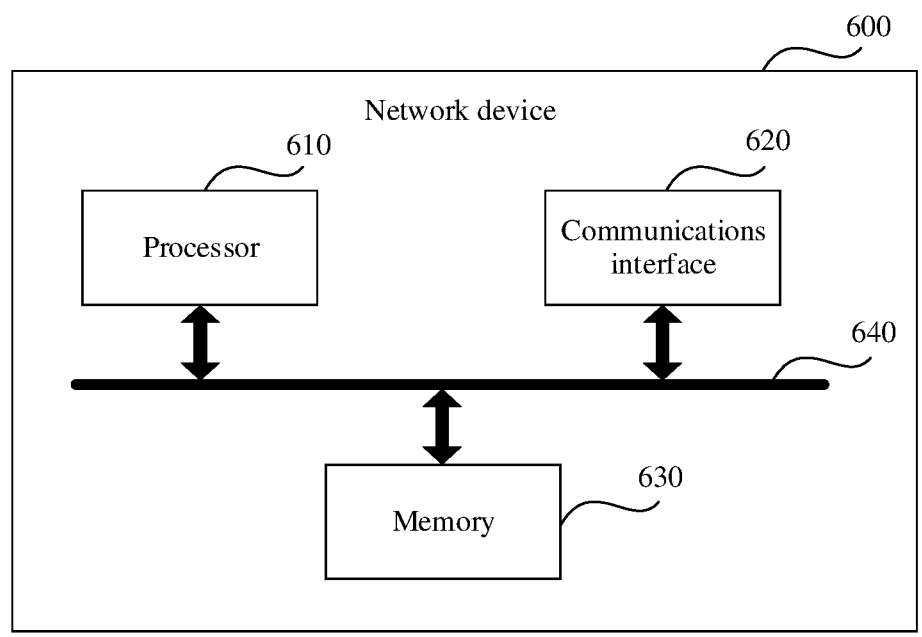
FIG. 6(a) is a schematic diagram of a structure of a network device 600 according to an embodiment of this application.
Figure 6B:
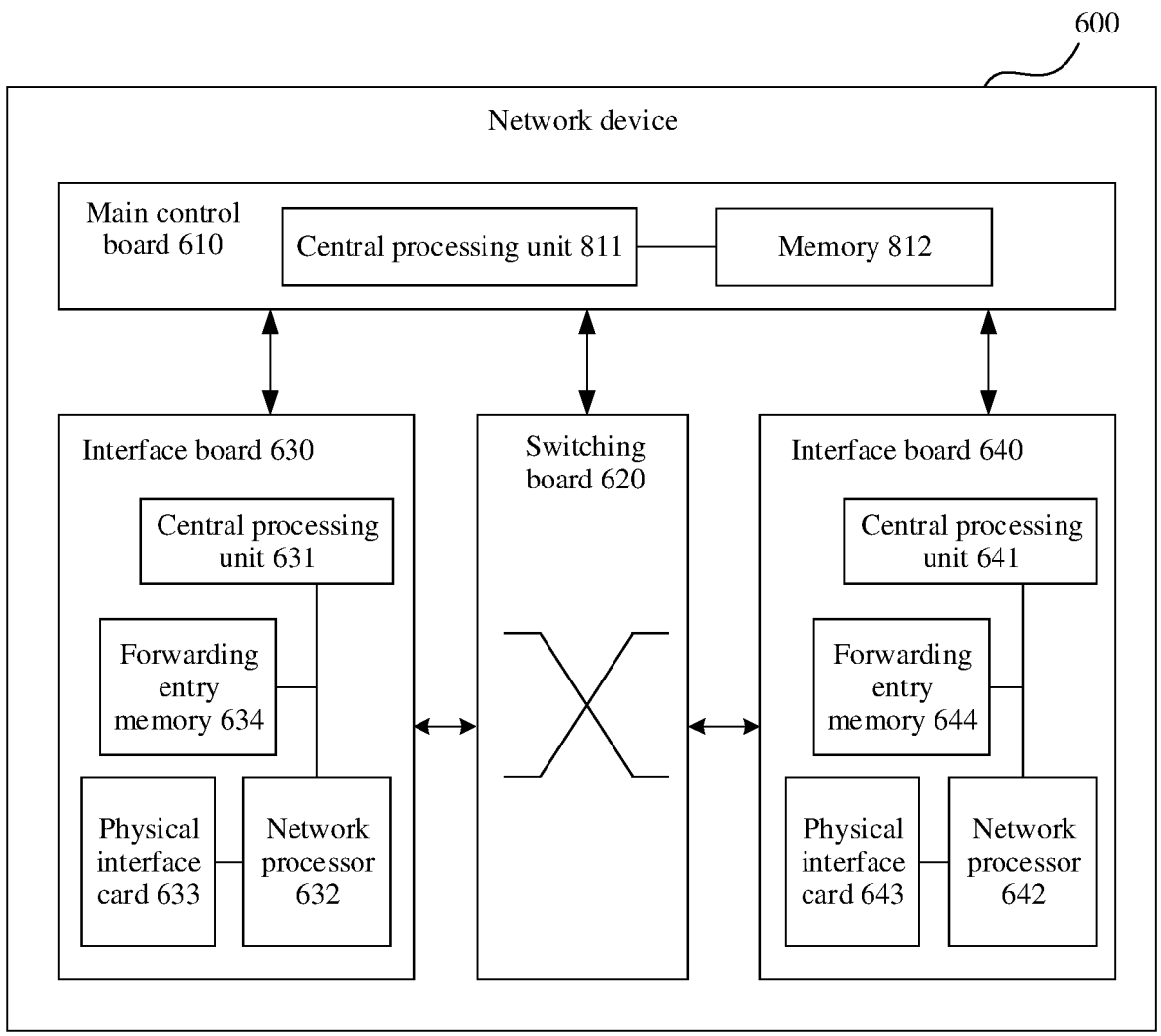
FIG. 6(b) is a schematic diagram of a structure of another network device 600 according to an embodiment of this application.

Refer to FIG. 6(*a*) and FIG. 6(*b*). An embodiment of this application provides a network device 600, as shown in FIG. 6(*a*). The network device 600 may be the instruction writing device in the embodiment in FIG. 2, or may be a network device including the instruction writing device in the embodiment in FIG. 2. Alternatively, the network device 600 may be a specific implementation of the instruction writing apparatus 500, or may be a network device including the instruction writing apparatus 500. The network device 600 includes a processor 620 and a communications interface 630, and optionally may further include a memory 610. The memory 610, the processor 620, and the communications interface 630 are connected through a bus 40. The bus 640 may be a peripheral component interconnect (PCI bus, an extended industry standard architecture (EISA) bus, a peripheral component interconnect express (PCIe) bus, or the like. The bus may be classified into an address bus, a data bus, a control bus, and the like. For ease of representation, only one bold line is used for representation in FIG. 6(*a*) and FIG. 6(*b*), but this does not mean that there is only one bus or only one type of bus.

In a specific embodiment, the processor 610 is configured to: obtain first indication information, where the first instruction information is used to indicate the instruction writing device to enable a first service function; and write a first microcode instruction set corresponding to the first service function into an unused storage space of a target microcode processor in a network processor, where a size of the unused storage space is greater than or equal to a size of the first microcode instruction set. For a detailed processing process of the processor 610, refer to the related detailed descriptions of S101 to S112 in the embodiment shown in FIG. 2. Details are not described herein again.

The communications interface 630 is configured to send the first microcode instruction set and a second microcode instruction set to the network processor. For a specific process, refer to the detailed descriptions of the embodiment shown in FIG. 2. Details are not described herein again. The memory 610 is configured to store a computer program or instructions executed by the processor 610 to implement the foregoing steps, and may further store the first microcode instruction set and the second microcode instruction set.

The memory 610 may be a random access memory (RAM), a flash, a read-only memory (ROM), an erasable programmable read-only memory (EPROM), an electrically erasable programmable read-only memory (EEPROM), a register, a hard disk, a removable hard disk, a CD-ROM, or any other form of storage medium known to a person skilled in the art.

The processor 620 may be, for example, a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in this application. Alternatively, the processor may be a combination of implementing a computing function, for example, a combination of one or more microprocessors or a combination of a DSP and a microprocessor.

The communications interface 630 may be, for example, an interface card, or may be an Ethernet interface or an asynchronous transfer mode (ATM) interface.

In a possible specific implementation, the network device 600 includes the instruction writing device and the network processor in the embodiment in FIG. 2. In this case, as shown in FIG. 6(*b*), the network device 600 includes a main control board 610 and an interface board 630.

The main control board 610 is also referred to as a main processing unit (MPU) or a route processor card. The main control board 610 controls and manages components in the network device 600, including routing calculation, device management, device maintenance, and protocol processing. The main control board 610 includes a central processing unit 811 and a memory 812.

The interface board 630 is also referred to as a line processing unit (LPU), a line card, or a service board. The interface board 630 is configured to: provide various service interfaces, and implement data packet forwarding. The service interface includes but is not limited to an Ethernet interface, a packet over SONET/SDH (POS) interface, and the like. The Ethernet interface is, for example, a flexible Ethernet service interface (also called Flexible Ethernet Clients, FlexE Clients). The interface board 630 includes a central processing unit 631, a network processor 632, a forwarding entry memory 634, and a physical interface card (PIC) 633.

The central processing unit 631 on the interface board 630 is configured to control and manage the interface board 630 and communicate with the central processing unit 631 on the main control board 610.

The network processor 632 is configured to execute a microcode instruction set, to implement a function such as packet forwarding. A form of the network processor 632 may be a forwarding chip, or a component combining software and hardware in another form, or hardware.

The physical interface card 633 is configured to implement a physical-layer interconnection function. Original traffic enters the interface board 630 from the physical interface card 633, and a processed packet is sent from the physical interface card 633. The physical interface card 633 includes at least one physical interface. The physical interface is also referred to as a physical port. The physical interface card 633 corresponds to a FlexE physical interface 204 in a system architecture 200. The physical interface card 633 is also referred to as a subcard, may be installed on the interface board 630, and is responsible for converting an optical/electrical signal into a packet, performing validity check on the packet, and forwarding the packet to the network processor 632 for processing.

Optionally, the network device 600 includes a plurality of interface boards. For example, the network device 600 further includes an interface board 640. The interface board 640 includes a central processing unit 641, a network processor 642, a forwarding entry memory 644, and a physical interface card 643.

Optionally, the network device 600 further includes a switching board 620. The switching board 620 may also be referred to as a switch fabric unit (SFU). When the network device has a plurality of interface boards 630, the switching board 620 is configured to complete data exchange between the interface boards. For example, the interface board 630 may communicate with the interface board 640 by using the switching board 620.

The main control board 610 is coupled to the interface board 630. For example, the main control board 610, the interface board 630, the interface board 640, and the switching board 620 are connected to a system backplane through a system bus to implement mutual communication. In a possible implementation, an inter-process communication (IPC) channel is established between the main control board 610 and the interface board 630, and the main control board 610 communicates with the interface board 630 through the IPC channel.

The instruction writing device in the embodiment corresponding to FIG. 2 may be, for example, the central processing unit 611 on the main control board 610, or may be the central processing unit 631 on the interface board 630. The network processor in the embodiment corresponding to FIG. 2 may be, for example, the network processor 632 on the interface board 630 or the network processor 642 on the interface board 640.

There may be one or more main control boards. When there are a plurality of main control boards, the main control boards may include an active main control board and a standby main control board. There may be one or more interface boards. There may also be one or more physical interface cards on the interface board. There may be no switching board or one or more switching boards. When there are a plurality of switching boards, load sharing and redundancy backup may be jointly implemented. In a centralized forwarding architecture, the network device may not need a switching board, and the interface board provides a function of processing service data in an entire system. In a distributed forwarding architecture, the network device may have at least one switching board, and data exchange between a plurality of interface boards is implemented by using the switching board, to provide a large-capacity data exchange and processing capability. Therefore, a data access and processing capability of the network device in the distributed architecture is better than that of the device in the centralized architecture. Optionally, a form of the network device may also be only one card, in other words, there is no switching board. Functions of the interface board and the main control board are integrated on the card. In this case, the central processing unit on the interface board and the central processing unit on the main control board may be combined into one central processing unit on the card to perform functions obtained after the two are combined, and the network processor is also on the card. A specific architecture that is to be used depends on a specific networking deployment scenario. This is not specially limited herein.

Figure 7:
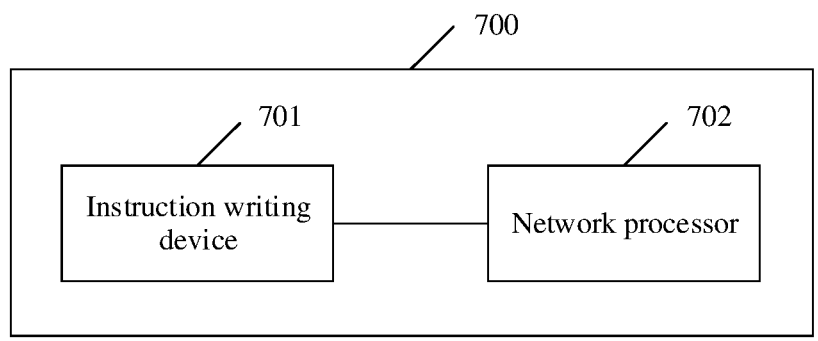
FIG. 7 is a schematic diagram of a structure of a network system 700 according to an embodiment of this application.

Refer to FIG. 7. An embodiment of this application provides a network system 700. The network system 700 includes an instruction writing device 701 and a network processor 702. The instruction writing device 701 may be the network device 600 in the embodiment shown in FIG. 6(*a*), or includes the instruction writing apparatus 500 in the embodiment shown in FIG. 5. The network processor 702 may be the network processor in the embodiment shown in FIG. 6(*a*). Specifically, the instruction writing device 701 is configured to perform related operations in S101 to S112 in the embodiment shown in FIG. 2, and the network processor 702 is configured to perform either of or both the first microcode instruction set and the second microcode instruction set that are written.

For related content of the instruction writing device 701 in the network system 700, refer to the descriptions in the foregoing embodiments. Details are not described herein again.

In addition, an embodiment of this application provides a computer-readable storage medium, including instructions. When the instructions are run on a computer, the computer is enabled to perform the instruction writing method that is applied to the instruction writing device 601 or the instruction writing device 701.

An embodiment of this application further provides a chip system, including a processor and an interface circuit. The interface circuit is configured to: receive instructions and transmit the instructions to the processor. The processor may be, for example, a specific implementation form of the instruction writing apparatus 500 shown in FIG. 5, and may be configured to perform the instruction writing method that is applied to the instruction writing device 601 or the instruction writing device 701. The processor is coupled to a memory, the memory is configured to store a program or instructions, and when the program or the instructions are executed by the processor, the chip system is enabled to implement the method in any one of the foregoing method embodiments.

Optionally, there may be one or more processors in the chip system. The processor may be implemented by hardware, or may be implemented by software. When the processor is implemented by the hardware, the processor may be a logic circuit, an integrated circuit, or the like. When the processor is implemented by the software, the processor may be a general-purpose processor, and is implemented by reading software code stored in the memory.

Optionally, there may also be one or more memories in the chip system. The memory may be integrated with the processor, or may be disposed separately from the processor. This is not limited in this application. For example, the memory may be a non-transitory memory such as a ROM. The memory and the processor may be integrated into a same chip, or may be separately disposed on different chips. A type of the memory and a manner of disposing the memory and the processor are not specifically limited in this application.

For example, the chip system may be a field programmable gate array (FPGA), an application-specific integrated circuit (ASIC), a system-on-a-chip (SoC), a central processing unit (CPU), a network processor (NP), a digital signal processor (DSP), a microcontroller unit (MCU), a programmable logic device (PLD), or another integrated chip.

It should be understood that the steps in the foregoing method embodiments can be completed by using a hardware integrated logical circuit in the processor or instructions in a form of software. The steps of the method disclosed with reference to embodiments of this application may be directly performed and completed by a hardware processor, or may be performed and completed by using a combination of hardware in the processor and a software module.

In the specification, claims, and accompanying drawings of this application, the terms "first", "second", "third", "fourth", and the like (if existent) are intended to distinguish between similar objects but do not necessarily indicate a specific order or sequence. It should be understood that the data used in such a way is interchangeable in appropriate circumstances, so that embodiments described herein can be implemented in other orders than the content illustrated or described herein. Moreover, terms "include", "contain" and any other variants thereof mean to cover the non-exclusive inclusion. For example, a process, a method, a system, a product, or a device that includes a list of steps or units is not necessarily limited to those expressly listed steps or units, but may include other steps or units not expressly listed or inherent to such the process, the method, the product, or the device.

In this application, "at least one item (piece)" means one or more, and "a plurality of" means two or more. In addition, "at least one of the following items (pieces)" or a similar expression thereof indicates any combination of these items, including a single item (piece) or any combination of a plurality of items (pieces). For example, at least one item (piece) of a, b, or c may represent: a, b, c, a and b, a and c, b and c, or a, b, and c, where a, b, and c may be singular or plural. In this application, it is considered that "A and/or B" includes only A, only B, and A and B.

For a detailed working process of the foregoing system, apparatus, and unit, refer to a corresponding process in the method embodiments. Details are not described herein again.

In several embodiments provided in this application, it should be understood that the disclosed system, apparatus, and method may be implemented in another manner. For example, the described apparatus embodiments are merely examples. For example, unit division is merely logical module division, and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be obtained according to actual requirements to achieve the objectives of the solutions of embodiments.

In addition, module units in embodiments of this application may be integrated into one processing unit, or each of the units may exist alone physically, or two or more units are integrated into one unit. The integrated unit may be implemented in a form of hardware, or may be implemented in a form of a software module unit.

When the integrated unit is implemented in the form of a software module unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium, and includes several instructions to enable a computer device (which may be a personal computer, a server, a network device, or the like) to perform all or some of the steps of the methods described in embodiments of this application. The storage medium includes any medium that can store program code, such as a USB flash drive, a removable hard disk, a read-only memory (ROM), a random access memory (RAM), a magnetic disk, or a compact disc.

A person skilled in the art should be aware that, in the foregoing one or more examples, the functions described in the present invention may be implemented by hardware, software, firmware, or any combination thereof. When the functions are implemented by the software, the functions may be stored in a computer-readable medium or transmitted as one or more instructions or code in the computer-readable medium. The computer-readable storage medium includes a computer storage medium and a communications medium. The communications medium includes any medium that enables a computer program to be transmitted from one place to another. The storage medium may be any available medium accessible to a general-purpose or special-purpose computer. In some embodiments, the computer-readable storage medium is a nonvolatile computer-readable storage medium.

What is claimed is:

1. A method comprising:
    obtaining, by a first device, first indication information, wherein the first indication information indicates the first device to enable a first service function;
    determining, by the first device, a target microcode processor based on one or more unused storage spaces respectively comprised in one or more microcode processors and a size of a first microcode instruction set, wherein the one or more microcode processors belong to a network processor, wherein the one or more microcode processors comprise the target microcode processor, and wherein a size of the unused storage space of the target microcode processor is greater than or equal to the size of the first microcode instruction set; and
    writing, by the first device, after determining a target microcode processor, the first microcode instruction set corresponding to the first service function into the unused storage space of the target microcode processor in the network processor.

2. The method according to claim 1, further comprising:
    obtaining, by the first device, second indication information, wherein the second indication information indicates that the first device is to disable the first service function; and
    unloading, by the first device, the first microcode instruction set from the target microcode processor based on the second indication information.

3. The method according to claim 1, wherein the network processor comprises a plurality of microcode processors, and wherein writing the first microcode instruction set comprises:
    writing the first microcode instruction set into each of the plurality of microcode processors, wherein the plurality of microcode processors comprise the target microcode processor.

4. The method according to claim 1, wherein the first microcode instruction set comprises a plurality of first microcode instruction subsets, and wherein each of the plurality of first microcode instruction subsets corresponds to one first service sub-function.

5. The method according to claim 4, further comprising:
    obtaining, by the first device, third indication information, wherein the third indication information indicates that the first device is to enable a second service function;
    determining, by the first device, a second microcode instruction set corresponding to the second service function, wherein the second microcode instruction set comprises a plurality of second microcode instruction subsets;
    comparing, by the first device, the plurality of first microcode instruction subsets with the plurality of second microcode instruction subsets; and
    unloading one or more third microcode instruction subsets, wherein the one or more third microcode instruction subsets belong to the plurality of first microcode instruction subsets, but do not belong to the plurality of second microcode instruction subsets.

6. The method according to claim 1, wherein the first microcode instruction set comprises a jump instruction, and wherein writing the first microcode instruction set comprises:
    obtaining, by the first device, a first start address of the first microcode instruction set that is allowed to be written into a storage space of the target microcode processor;
    determining, by the first device, a jump address of the jump instruction in the storage space based on a relative offset address of a jump address of the jump instruction in the first microcode instruction set and the first start address, wherein the jump instruction is an instruction directing a jump operation; and
    writing, by the first device, the jump instruction into the target microcode processor based on the jump address of the jump instruction in the storage space.

7. The method according to claim 1, further comprising:
    organizing, by the first device, a plurality of fragment storage spaces of the target microcode processor to obtain the unused storage space, wherein the size of the unused storage space is equal to a sum of sizes of the plurality of fragment storage spaces.

8. The method according to claim 1, wherein, before the first device writes the first microcode instruction set into the unused storage space, the storage space of the target microcode processor stores a fourth microcode instruction set and a fifth microcode instruction set, and wherein the method further comprises:
    obtaining, by the first device, based on a storage space between the fourth microcode instruction set and the fifth microcode instruction set not being occupied, an end address of the fourth microcode instruction set in the target microcode processor and an original second start address of the fifth microcode instruction set in the target microcode processor, wherein the end address is less than the original second start address; and
    modifying, by the first device, the original second start address of the fifth microcode instruction set to an updated second start address, wherein the updated second start address is between the end address and the original second start address.

9. The method according to claim 1, wherein before the first device writes the first microcode instruction set into the unused storage space, the target microcode processor comprises a fourth microcode instruction set and a fifth microcode instruction set, and wherein the method further comprises:
    obtaining, by the first device, based on a storage space between the fourth microcode instruction set and the fifth microcode instruction set not being occupied, an original third start address of the fourth microcode instruction set, a length of a storage space occupied by the fourth microcode instruction set, and a second start address of the fifth microcode instruction set in the target microcode processor, wherein the original third start address of the fourth microcode instruction set is less than the second start address;

determining, by the first device, an updated third start address of the fourth microcode instruction set based on the second start address of the fifth microcode instruction set and based on the length of the storage space occupied by the fourth microcode instruction set, wherein the updated third start address is between the original third start address and the second start address; and modifying, by the first device, the original start address of storing the fourth microcode instruction set to the updated third start address.

10. The method according to claim 1, wherein before writing the first microcode instruction set, the method further comprises:

writing, by the first device, based on the network processor being powered on, a necessary instruction set into the unused storage space of the target microcode processor in the network processor.

11. An apparatus comprising:
a processor; and
a non-transitory computer-readable memory storing a program to be executed by the processor, the program including instructions to:
obtain first indication information, wherein the first indication information indicates the apparatus is to enable a first service function; and
determine a target microcode processor based on one or more unused storage spaces respectively comprised in one or more microcode processors and a size of the first microcode instruction set, wherein the one or more microcode processors belong to a network processor, wherein the one or more microcode processors comprise the target microcode processor, and wherein a size of the unused storage space of the target microcode processor is greater than or equal to a size of a first microcode instruction set; and
write the first microcode instruction set corresponding to the first service function into the unused storage space of the target microcode processor in the network processor.

12. The apparatus according to claim 11, wherein the instructions further include instructions to:
obtain second indication information, wherein the second indication information indicates the apparatus is to disable the first service function; and
unload the first microcode instruction set from the target microcode processor based on the second indication information.

13. The apparatus according to claim 11, wherein the instructions further include instructions to:
write the first microcode instruction set into each of a plurality of microcode processors, wherein the plurality of microcode processors comprise the target microcode processor.

14. The apparatus according to claim 11, wherein the first microcode instruction set comprises a plurality of first microcode instruction subsets, and wherein each of the plurality of first microcode instruction subsets implements a first service sub-function.

15. The apparatus according to claim 14, wherein the instructions further include instructions to:
obtain third indication information, wherein the third indication information indicates the apparatus is to enable a second service function;
determine a second microcode instruction set corresponding to the second service function, wherein the second microcode instruction set comprises a plurality of second microcode instruction subsets; and
compare the plurality of first microcode instruction subsets with the plurality of second microcode instruction subsets; and
unload one or more third microcode instruction subsets, wherein the one or more third microcode instruction subsets belong to the plurality of first microcode instruction subsets, and wherein the one or more third microcode instruction subsets do not belong to the plurality of second microcode instruction subsets.

16. The apparatus according to claim 11, wherein the first microcode instruction set comprises a jump instruction; and wherein the instructions further include instructions to:
obtain a first start address of the first microcode instruction set that is allowed to be written into a storage space of the target microcode processor;
determine a jump address of the jump instruction in the storage space based on a relative offset address of a jump address of the jump instruction in the first microcode instruction set and the first start address, wherein the jump instruction is an instruction to perform a jump operation; and
write the jump instruction into the target microcode processor based on the jump address of the jump instruction in the storage space.

17. The apparatus according to claim 11, wherein the instructions further include instructions to:
organize a plurality of fragment storage spaces of the target microcode processor to obtain the unused storage space, wherein the size of the unused storage space is equal to a sum of sizes of the plurality of fragment storage spaces.

18. The apparatus according to claim 11, wherein the instructions further include instructions to:
obtain, based on a storage space between a fourth microcode instruction set and a fifth microcode instruction set not being occupied, an end address of the fourth microcode instruction set in the target microcode processor and an original second start address of the fifth microcode instruction set in the target microcode processor, wherein the end address is less than the original second start address; and
modify the original second start address of storing the fifth microcode instruction set to an updated second start address, wherein the updated second start address is between the end address and the original second start address.

* * * * *